United States Patent [19]

Theodoulou et al.

[11] Patent Number: 5,003,327
[45] Date of Patent: Mar. 26, 1991

[54] PRINTER AUTOCONTRAST CONTROL

[75] Inventors: Sotos M. Theodoulou, Bramalea; William K. Baker, North York, both of Canada

[73] Assignee: Delphax Systems, Randolph, Mass.

[21] Appl. No.: 437,366

[22] Filed: Nov. 15, 1989

[51] Int. Cl.⁵ .................. G01D 15/00; G03G 21/00
[52] U.S. Cl. ................................. 346/154; 355/246
[58] Field of Search .............. 346/154, 155, 160, 159; 355/246, 208; 427/8

[56] References Cited

U.S. PATENT DOCUMENTS

| | | | |
|---|---|---|---|
| 3,922,380 | 11/1975 | Rowell et al. | 427/8 |
| 4,050,806 | 9/1977 | Miyakawa et al. | 355/208 |
| 4,405,226 | 9/1983 | Kiumra et al. | 355/246 |
| 4,468,112 | 8/1984 | Suzuki et al. | 355/246 |
| 4,538,897 | 9/1985 | Osaka et al. | 355/246 |
| 4,571,068 | 2/1986 | Tarumi et al. | 355/246 |
| 4,600,294 | 7/1986 | Suzuki et al. | 355/246 |
| 4,607,954 | 8/1986 | Osaka et al. | 355/246 |
| 4,755,850 | 7/1988 | Suzuki et al. | 355/265 |
| 4,779,106 | 10/1988 | Mills | 346/154 |
| 4,786,924 | 11/1988 | Folkins | 355/208 |
| 4,796,065 | 1/1989 | Kanbayashi | 355/246 X |
| 4,916,488 | 4/1990 | Kimura | 355/246 X |

Primary Examiner—Donald A. Griffin
Attorney, Agent, or Firm—Lahive & Cockfield

[57] ABSTRACT

A printer autocontrast system measures the current passing from a toner reservoir to a charged dielectric member which receives toner from the reservoir. The charge delivered to the drum in this way is scaled and compared to an estimate of the intended image charge to develop an error signal. The error signal corrects a control parameter to adjust the operation of an electrographic printhead which forms a latent image on the dielectric member.

7 Claims, 3 Drawing Sheets

PRINTER AUTOCONTRAST CONTROL

BACKGROUND OF THE INVENTION

The present invention relates to electrographic imaging apparatus wherein a latent image is formed on a dielectric member and this image is toned to print out a permanent image on a recording sheet such as paper. Putting aside factors such as variation in toner composition, the amount of toner picked up by the imaging member depends on the charge distribution on the surface of the dielectric member, and this distribution may vary, for a given constant image pattern, due to environmental factors such as humidity and the aging or adjustment of various operating parameters of the machine. Thus, for example, in a photocopier, the charge may vary as the copy lamps or the photoconductive imaging member age and their characteristics change, or as the corona charging assembly and power supplies drift.

To compensate for variations in drum charge, it is common to provide a manual contrast control on such machines. Such a control may operate by shifting a corona charging potential, changing a transfer or bias potential used to transfer toner to the drum, or by some similar adjustment to compensate for the low or high density, or low or high contrast, which the charge distribution would normally produce.

In a like manner, it is also known to provide automated contrast or density control circuits which sense the charge on the drum and make similar adjustments to the lamp intensity, developing bias control or other such control parameter. Such sensors may sense the charge on a non-image position of the drum, or may identify a minimum value of the drum potential as the drum rotates past a sensor. It is also known to use an optical densitometer to sense the density of the toner which has adhered to the charged drum, and to make compensatory adjustments based on the sensed optical density, to some machine parameter.

In general, the setting up of an autocalibration system is believed to entail inspection of the amount of toner applied at a given setting for one or more particular fixed test patterns or test images, and special initialization procedures are used to evaluate and adjust system print darkness. Thus, these systems do not adjust print density on a-page-by-page basis for normal print images. A more general autocontrast control is therefore desirable.

SUMMARY OF THE INVENTION

In accordance with the present invention, an electrographic printer develops control signals which actuate a pointwise charging printhead array to charge a moving dielectric member, and processes the control signals to also provide an intended image density signal. The charged dielectric member is toned by application of a conductive toner at a toning station downstream from the printhead, and current flow from the toner reservoir to the dielectric member is measured to give a direct measure of the amount of toner transferred to the latent image member, thus giving an actual image density signal. Each of the two signals are accumulated and the difference of the accumulated signals gives an error signal indicative of the difference between the intended charge density and the actual image density. The error signal is iteratively computed and applied to provide a sequence of control signals $Y(k)$ for the printhead charge transfer level.

In a preferred embodiment, the intended image density signal is determined by an estimation processor which converts information on charge dot actuations of the printhead to an estimate of the corresponding local level of charge theoretically deposited on the drum.

In different control processes, the initial control value may be set to a constant, or to a value which is a function of printhead or drum age, or the like. The error signal is calculated for each page and provides the control value which is implemented in the succeeding page. A non-linear function of charge actuations models the expected charge denoted $E[Q(k)]$. Alternatively, a non-linear correction may be made to the actual toner current signal before comparing it to a linear charge estimate.

BRIEF DESCRIPTION OF DRAWINGS

These and other features of the invention will be understood from the description below, taken together with the drawings, wherein.

DETAILED DESCRIPTION OF INVENTION

Figure 1:
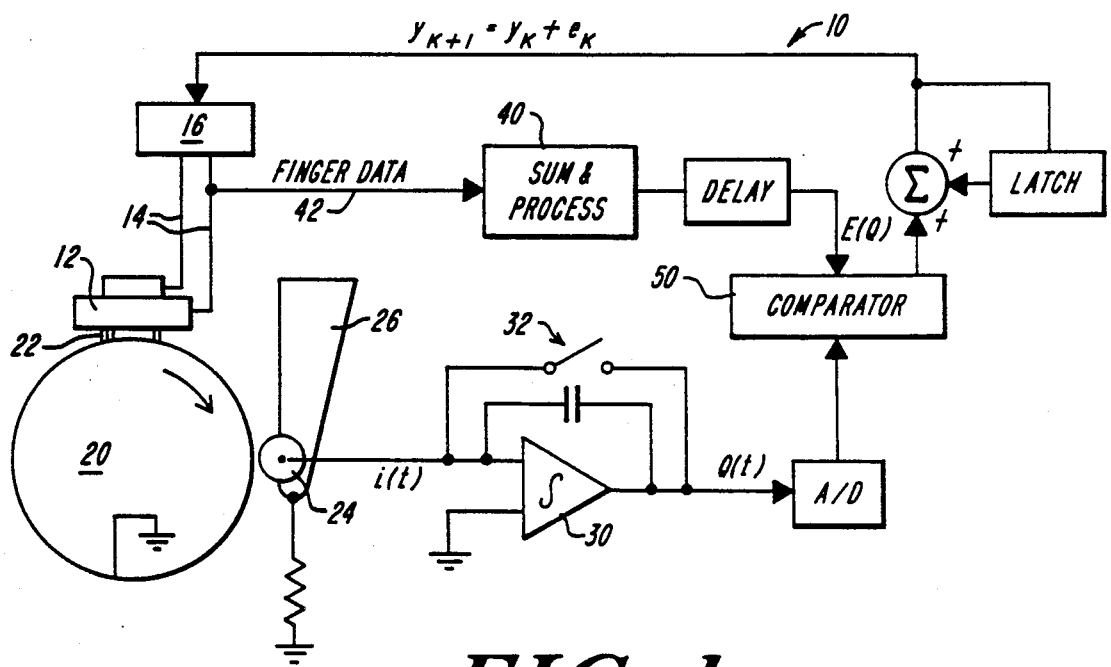
FIG. 1 is a simplified conceptual drawing of an autocalibration system according to the present invention.

FIG. 1 shows in schema one autocalibration system 10 according to the present invention. An ionographic or similar pointwise actuated charge generation unit 12, commonly referred to as a printhead, receives actuation signals along lines 14 from a printhead controller 16 synchronized with rotation of a dielectric drum 20 to project charge carriers 22 at the drum and deposit a pointwise defined latent charge image thereon. A suitable printhead is, for example, an ionographic printhead of the general type described in U.S. Pat. Nos. 4,628,227 or 4,679,060. For purposes of this description, the salient trait of such a printhead is that a finger electrode control signal is applied to each activated dot of the printhead to enable the gating of one charge burst to form a corresponding latent image dot on the drum, so that the plurality of finger electrode control signals may provide an indication of the intended charge directed to the drum. The finger electrode control signals are also provided along line 42 to a processor and summer 40 which sums and processes these signals to develop a quantity $E[Q(t)]$ representing the intending charge to be deposited on the drum.

After drum 20 rotates a quarter turn, a toner roll 24 located in a toner reservoir 26 provides a uniform flow of toner across a gap from the roll to the drum so that toner bridges the gap and adheres to the charged reach of the drum with a toner distribution corresponding to the charge distribution. The toner may be a conductive toner, that is, one having a conductivity in the range of $5 \times 10^4$ to $5 \times 10^7$ ohm centimeters, and the reservoir in any case is at a floating potential V with respect to ground, so that each toner particle transferred to drum 20 carries a certain amount of charge. The current flow from the reservoir to the drum is thus a direct measure of the volume of toner actually taken up by the drum at each instant. As will be apparent from the following description, the invention applies also to a printing system using non-conductive toners.

As shown in FIG. 1, an amplifier 30 controlled by reset/enable switch 32 integrates the toner current signal i(t) to determine a function Q(t) equal to the charge transferred during an accumulation interval.

Meanwhile an intended charge estimation module 40 receives the printhead finger actuation data along line 42 and sums, and may also process, this data to develop an estimate signal E[Q(t)] representing the amount of charge which the printhead was intended to deposit on the drum. The estimate E[Q(t)], if not already in digital form, is A/D converted, delayed one quarter turn to be in phase with the current sensor at the toner roll, and compared to the actual drum charge Q(t) by comparator 50 to develop an error signal e(t). This error signal is applied to modify a printhead control parameter Y(k) in a direction to decrease the error.

In an ionographic printhead as described in the above patents, in which the amount of charge is controlled by bias voltages applied to the screen and finger electrodes of the printhead, the control parameter Y(k) may control the finger electrode back bias and allow the controlled adjustment of the amount of charge actually gated by each finger electrode activation.

Figure 2:
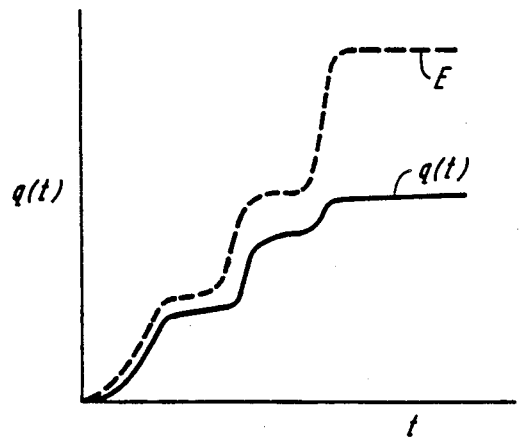
FIG. 2 is a graph of accumulated drum charge discrepancy for a typical image.

FIG. 2 shows a representative graph of actual and intended charge density q(t) indicating one form of discrepancy between the two for a printhead of the aforesaid type. Such printheads deposit point-like charge dots which overlap on the drum, so that for a point, a line and a two dimensional region one might expect the total charge to be approximately one, two and four times the basic charge dot level as indicated in the dashed-line curve E of expected charge. In actuality, owing to the increasing local charge at the drum surface, space charge effects, and the like, the locally developed charge may be substantially lower, as shown in the solid curve q(t). Thus, the charge error is a possibly non-linear function which increases with charge level.

Figure 3:
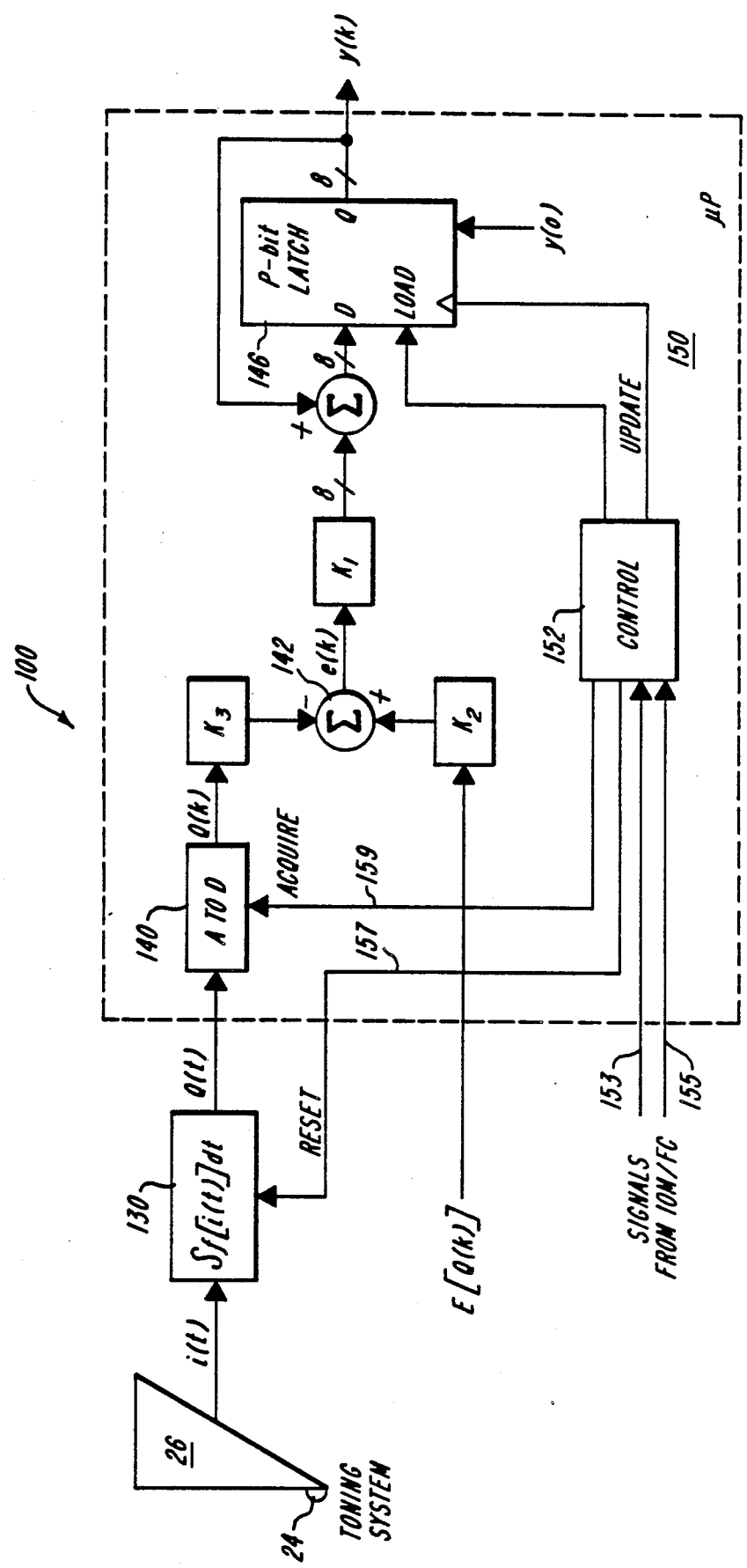
FIG. 3 is a more general conceptual drawing of an autocalibration system according to the invention.

A more general construction 100 of an autocontrast control system according to the invention is shown in FIG. 3. This embodiment operates digitally to produce an output control signal Y(k), which may specify a back bias control voltage as described above, which compensates for non-linearities of charge delivery.

In this embodiment the toner current signal i(t) is processed and accumulated by a functional integrator 130 to develop the charge signal Q(t), and both the charge signal and an expected charge signal E[Q(k)] are fed as inputs to a microprocessor 150. The expected charge signal is represented by a count of the number of dots needed to form the desired image, which is obtained by counting the number of logic "ones" transferred to the finger electrode drive cicuitry, times an empirical factor for the particular back bias specified by the current control value Y(k).

Within microprocessor 150, a control unit 152 receives start of page and drum rotation signals along lines 153, 155 from the input/output module interface card which controls the print engine, and provides phased start of page, reset, and enable signals to the functional integrator 130 and A/D input port 140 along timing control lines 157, 159, respectively. The digitized charge Q(k) and expected charge E[Q(k)] are multiplied by multipliers K3, K2, respectively, and differenced in adder 142. Their difference e(k) is scaled by $K_1$ to provide an 8-bit control word which is subtracted from the current Y(k) and is stored in 8-bit output latch 146. Latch 146 receives load and update strobes from the timing control unit 152, and replaces the control value Y(k) with the updated value $Y(k+1) = Y(k) - k_1 e(k)$ when the processing has been completed. The scaling factors $K_2$ and $K_3$ are used to match the magnitudes of E[Q(k)] and Q(k). $K_1$ is made small to provide stability and noise immunity, and could in practice be included in the gains $K_2$ and $K_3$.

The operation of controller 100 updates Y(k) with each page imaged, and converges after several pages to some value which varies slowly with printhead evolution. The scaling and summing processes indicated in the drawing are effected by a microcode program of microprocessor 150, and the processor may implement more complex control laws than indicated here. Such control laws may vary the scale factors employed at extreme values of detected or expected charge, or may provide a non-constant initial control value Y(0) to the output latch 146 which varies in accordance with some system parameters such as power supply voltage, printhead age or the like.

Figure 4:
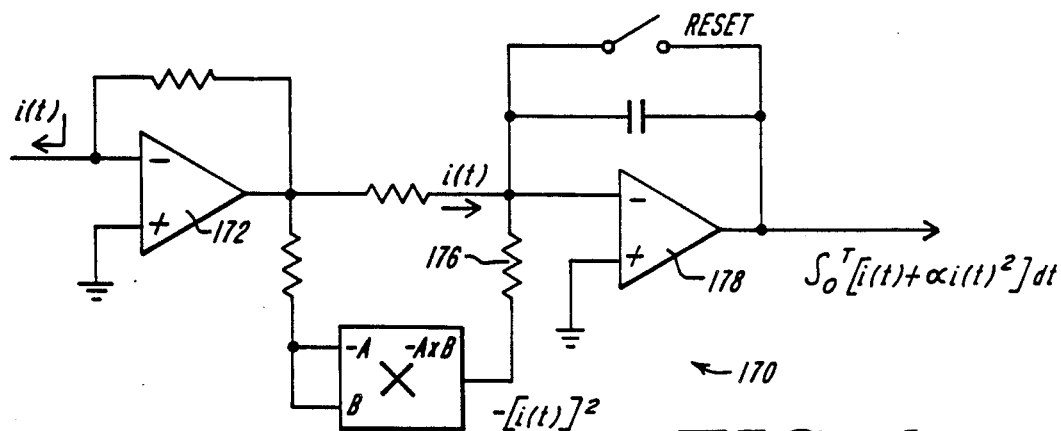
FIG. 4 shows one implementation of a charge accumulator portion of the system of FIG. 3.

FIG. 4 shows an analog functional integrator/which may be used for element 130 of FIG. 3.

In this embodiment, a first amplifier 172 develops an output i(t) proportional to toner charge current which is fed to both inputs —A and +B of an multiplier 174 to develop an additional signal proportional to $[i(t)]^2$. The latter is scaled by a resistor 176 to provide a scaled signal $\alpha[i(t)]^2$, and both signals are applied to integrating amplifier 178 to develop an output equal to the integral of $i(t) + \alpha i(t)^2$, where $\alpha << 1$. The number $\alpha$ is selected to reduce non-linear charge delivery effects as discussed above in relation to FIG. 2. The value resistor 176 determines the scale value $\alpha$ in this circuit.

In other embodiments of the invention, rather than employing an analog non-linear integrator, the formation of the quantity $i(t) + \alpha i(t)^2$ may be effected digitally by sampling i(t) over the image length and processing it in the microprocessor 150, thus reducing circuit complexity. Other non-linear functions may also be implemented in this manner.

Figure 5A:
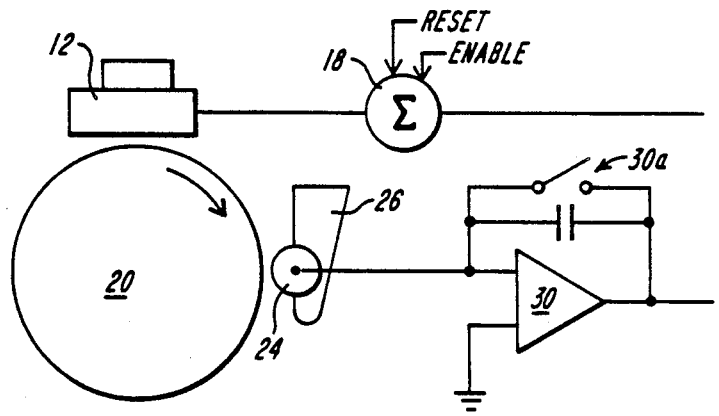
FIGS. 5A, 5B illustrate the geometry and timing, respectively, of elements of the system of FIGS. 1 or 3.
Figure 5B:
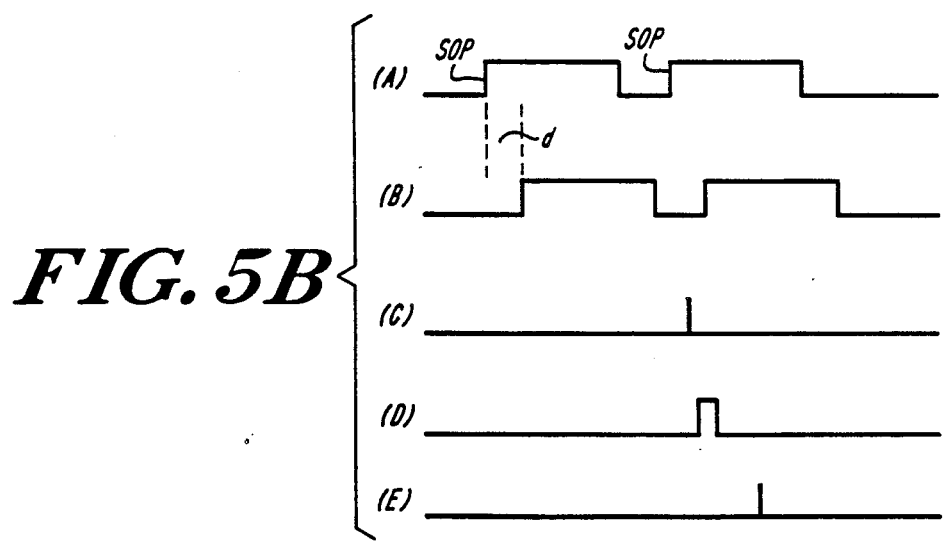

FIGS. 5A, 5B illustrate timing aspects of the invention. The finger data from the printhead controller are summed by an adder 18 having reset and enable inputs, whereas the toner charge is processed by an integrator 30 (FIGS. 1) or functional integrator 130 (FIG. 3) having a reset line 30a.

As shown in FIG. 5B, line (A), printhead charging occurs for a fixed duration after a start of page signal SOP, during which time the finger enable logic "ones" are accumulated by the adder 18.

After a delay d corresponding to the drum rotation between printhead 12 and toner roller 24, the integrator 30 is activated with signal (B) to amplify and accumulate the toner charge signal during a one-page length of drum rotation. At the end of toning of the page, a strobe signal, line (C), is provided to sample the integrator, the integrator is reset, line (D), and, after the short time required for differencing the signals and updating the control value Y(k+1) (FIG. 3) the output latch is strobed, line (E). Thus, after one page, the control value Y(k) is changed during the printing of the next page to reduce the error function e(k). It will be understood that the microprocessor 150 (FIG. 3) or interface card may further implement a timing control program or register which implements the change in control parameter Y(k) just before initiating printing of the next full page. However, in FIG. 3, gain $K_1$ of the error signal is chosen to be small, with the consequence that the successive incremental changes in the control parameter Y(k) are small and do not appear as an observable transition on the printed image. Thus, it will generally not be necessary to force the parameter change to be delayed until after an interpage gap.

It will be appreciated that the autocontrast system of the present invention, in deriving its control values form a measurement of actual toner transfer rather than drum charge, automatically compensates for a number of variables which affect image quality.

The present autocontrast system may also be implemented using known techniques of image evaluation to provide particular or less general systems. For example, the autocontrast apparatus may be run when a particular test pattern image is deposited by the printhead, for which a particular control law Y[k] has been determined to be effective. Thus, the printhead may be actuated to print a known pattern of dots, lines, characters of two dimensional shapes and run until the autocontrast control has produced a stable control value $Y(k_i)$, after which the autocontrast control is disabled and the same value $Y(k_i)$ is maintained for a period of continuous use. The particular test pattern may be selected to suit the type of printing job which is to be run, such as half-tone, character printing, or block graphics. The system may be especially useful for MICR printing of the characters encoding electronically processed bank account numbers, for which the autocontrast system of the present invention offers the advantage of precisely repeatable image density without loss of character definition.

Additionally, the autocalibration circuit may be used for system testing. Specifically, for a fixed control value Y(k), a series of test images may be printed either on a per page basis or on a per window basis with a single page segmented into several image areas. The charge for each image area is measured and compared for a set of isomorphic patterns. A "large" difference in measured charges indicates a deficiency within the print system. By applying specialized test patterns, one deduces the nature of the printer system fault and location of faulty components.

The invention being thus disclosed and described, modifications and variations thereof to suit particular machines and processes will occur to those skilled in the art, and such variations and modifications are considered to be within the scope of the invention, as defined in the claims appended hereto:

What is claimed is:

1. An autocontrast system for an electrographic print system of the type having a printhead which is actuated by control signals to deposit a latent charge image on a dielectric member and a toner system for applying a conductive toner to the dielectric member to develop the latent charge image, such auto contrast system comprising first means operative on said control signals for developing an expected density signal indicative of an intended density, second means for developing an indication of current flow between said toner system and the dielectric member as the toner is applied to the dielectric member, and comparing means for comparing functions of the expected density signal and the indication of current flow, to determine an error signal therefrom, said error signal being applied to adjust an operating parameter of the print system to affect the amount of pointwise latent image charge deposited by the printhead.

2. Apparatus for maintaining a desired level of contrast in a toned image which is developed by the application of toner to a moving surface which receives an image forming charge distribution from a charge-depositing member as said surface moves, such apparatus comprising first means, in operative communication with said charge depositing member for developing a first signal indicative of the intended rate of deposition of charge on said surface, second means, coupled to a supply of toner for developing a second signal indicative of the current flow between said supply of toner and said surface, third means for processing said first and second signals to develop a third signal which varies as contrast of the toned image varies from a desired contrast, and control means responsive to said third signal to change an operating parameter of the apparatus so as to maintain the desired level of contrast.

3. Apparatus according to claim 2, wherein said third means includes means for integrating the second signal.

4. Apparatus according to claim 2, wherein the third means includes means for operatively differencing functions of said first and second signals.

5. Apparatus according to claim 4, wherein the third means includes means for delaying the phase of a first or second signal such that the two signals correspond to the same portion of a charge image and a toned image, respectively.

6. An autocalibration system for an electrographic printer of the type which is actuated by control signals to form a pointwise latent charge image on a dielectric member and which includes a toner system for applying a toner to the dielectric member to develop the latent charge image, such autocalibration system comprising first means operative on said control signals for developing an expected charge signal indicative of an intended latent image charge, second means for providing an indication of the amount of toner passing between a toner reservoir and the dielectric member, integrating means for integrating the indication provided by the second means to develop an output, and comparing means for comparing functions of the expected charge signal and the output of the integrating means, to determine an error signal therefrom, said error signal being applied to adjust an operating parameter of the print system to affect the amount of pointwise latent image charge formed on said dielectric member.

7. A method for maintaining a desired level of contrast in a toned image which is developed by the application of toner to a moving surface which received an image forming charge distribution from a charge-depositing member as said surface moves, such method comprising the steps of developing, from the operation of said charge depositing member, a first signal indicative of the intended rate of deposition of charge on said surface, developing a second signal indicative of current flow between said supply of toner and said surface, operatively differencing said first and second signals to develop a third signal which varies as the contrast of the toned image varies from a desired contrast, and in response to said third signal, changing an operating parameter of the apparatus by an amount effective to maintain the desired level of contrast.

* * * * *